US008665709B2

(12) United States Patent
Young (10) Patent No.: US 8,665,709 B2
(45) Date of Patent: Mar. 4, 2014

(54) USE OF 1:1 PROTECTION STATE MACHINE FOR LOAD SHARING AND ALTERNATIVE PROTECTION SCHEMES

(75) Inventor: Kenneth W. Young, Kanata (CA)

(73) Assignee: Ciena Corporation, Hanover, MD (US)

( * ) Notice: Subject to any disclaimer, the term of this patent is extended or adjusted under 35 U.S.C. 154(b) by 729 days.

(21) Appl. No.: 12/481,076

(22) Filed: Jun. 9, 2009

(65) Prior Publication Data

US 2010/0309778 A1    Dec. 9, 2010

(51) Int. Cl.
*G01R 31/08* (2006.01)
(52) U.S. Cl.
USPC ........... 370/225; 370/216; 370/217; 370/221; 370/227
(58) Field of Classification Search
USPC .................. 370/219, 216, 221, 225, 228, 227
See application file for complete search history.

(56) References Cited

U.S. PATENT DOCUMENTS

| 6,904,286 | B1 | 6/2005 | Dantu |
| 6,992,978 | B1 * | 1/2006 | Humblet et al. ............... 370/228 |
| 7,433,671 | B2 * | 10/2008 | Kailbach et al. ............... 455/403 |
| 2004/0170179 | A1 | 9/2004 | Johansson et al. |
| 2004/0170186 | A1 | 9/2004 | Shao et al. |
| 2004/0240884 | A1 * | 12/2004 | Gumaste et al. ............... 398/59 |
| 2006/0018252 | A1 * | 1/2006 | Sridhar et al. ............... 370/216 |
| 2009/0161562 | A1 * | 6/2009 | Shah et al. ............... 370/245 |
| 2010/0135291 | A1 * | 6/2010 | Martin et al. ............... 370/389 |

FOREIGN PATENT DOCUMENTS

| EP | 1124356 A2 | 8/2001 |
| WO | WO 2004057817 A2 | 7/2004 |

* cited by examiner

*Primary Examiner* — Omer S Mian
(74) *Attorney, Agent, or Firm* — Clements Bernard PLLC; Christopher L. Bernard; Lawrence A. Baratta, Jr.

(57) ABSTRACT

A system is provided for sharing a protection path between at least two protection groups in a network. The system includes at least one working path associated with each of the protection groups, and at least one working maintenance entity group ("WMEG") monitoring the status of each of the working paths. Each WMEG notifies the protection group associated with the monitored working path of changes in the status of the monitored working path. At least one protection entity group ("PMEG") monitors the status of the protection path and notifies each of the protection groups of changes in the status of the protection path. Each of the protection groups is switchable to the protection path in response to the receipt of notifications from the WMEG of changes to a non-operational status for the respective working paths associated with each of the protection groups.

8 Claims, 6 Drawing Sheets

USE OF 1:1 PROTECTION STATE MACHINE FOR LOAD SHARING AND ALTERNATIVE PROTECTION SCHEMES

FIELD OF THE INVENTION

The present invention generally relates to protection switching for telecommunication network and, in particular, to the use of 1:1 protection state machines for alternative protection schemes and for load sharing.

BACKGROUND OF THE INVENTION

Transport networks implement a key function of protection switching upon failure of network resources. Protections switching state machines are usually standardized for technologies that implement the capabilities as they require both end points to perform similar actions.

For example, IEEE802.1Qah [1] standardizes the separation of client services and transport servers. The related traffic engineering components were added in the IEEE802.1Qay standard. The IEEE802.1Qay standard initially specified a one for one (1:1) linear protection between a source and a destination in a network. This capability is accomplished using two tunnels or Traffic Engineered Service Instances (TESIs) which link the maintenance endpoints of the source and destination using a different path through the network. The two TESIs are combined at each end by a protection group which handles the decision of which of the TESIs is being used as the forwarding path at a given point based on their status. Each TESI is monitored by a Maintenance Association (MA) which monitors the status of the TESI using Continuity Check Messages (CCM). The status of the TESI is provided by the MA to the protection group, which in turn decides which TESI is being used as the forwarding path.

Figure 1:
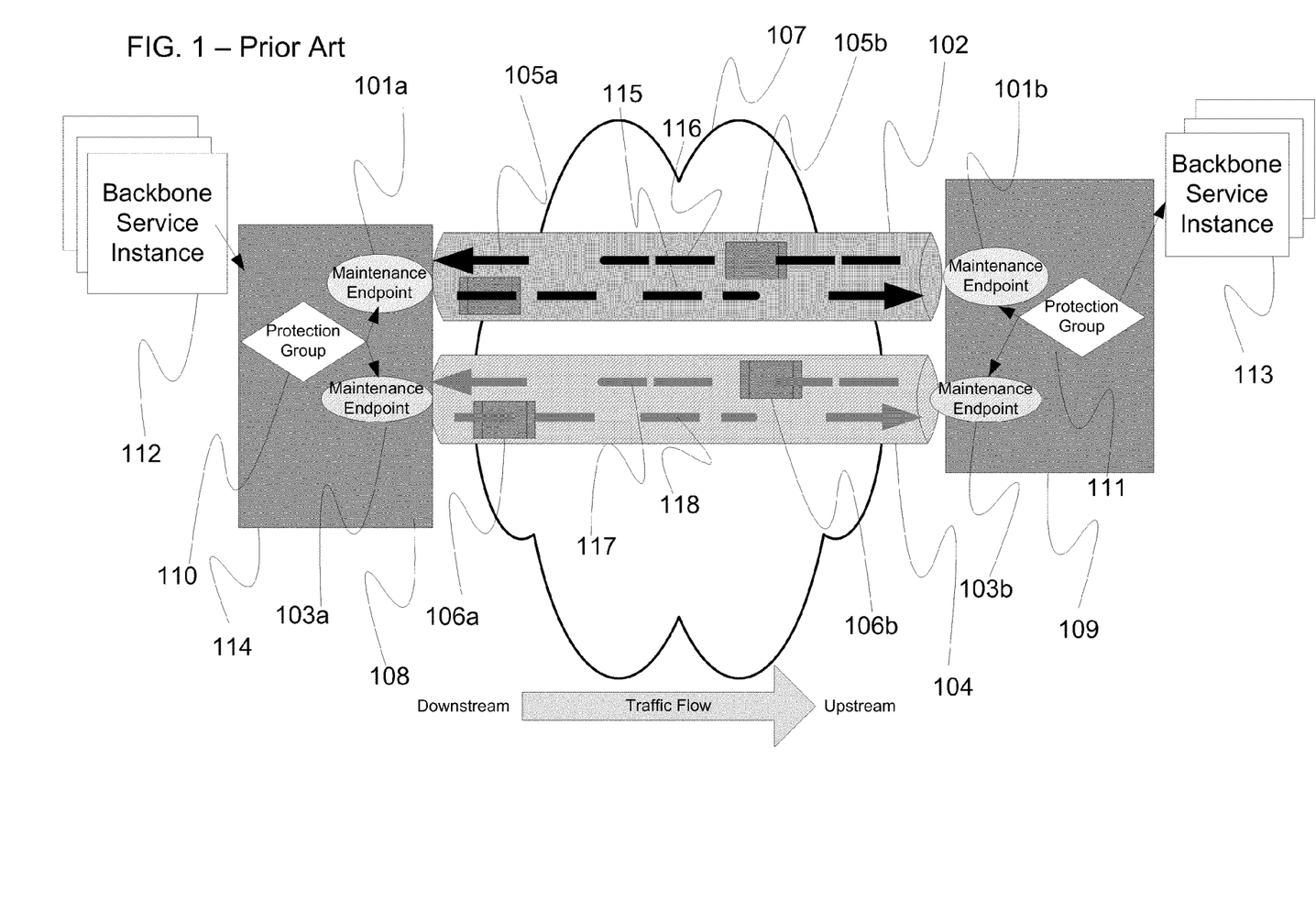
FIG. 1 is a diagrammatic illustration of a prior-art network.

Referring to the network view in FIG. 1, a head endpoint system 108 and a tail endpoint system 109 are configured at the edge of the network. Services or clients use Backbone Service Instances (BSIs) 112, 113 as connections in each direction between the head and tail endpoint. The BSIs 112, 113 are switched on the working TESI 102, comprised of two Ethernet Switched Paths (ESPs) 115, 116. A protection TESI 104 is supplied using another set of ESPs 117, 118. Protection management is provided by the protection groups 110, 111. The MAs 101a, 101b and 103a, 103b provide the state of the TESIs 102, 104 to the protection groups 110, 111.

The MAs (one at the head and one at the tail) use Operation Administration and Maintenance (OAM) 105a, 105b, 106a, 106b, to check communication continuity in the TESI across the network 107 and establish the state of the TESIs 102, 104. The MAs 101a, 103a share the state with the associated protection group 110 which uses the state information to which the TESIs are set as active for the protection group 110. Similarly, the maintenance association 101b, 103b share their state with the associated protection group 111 which uses the state information to which TESI to set as active for the protection group 111. The services (or Backbone Service Instances) 112, 113 are mapped to the protection groups 110, 111 based on service provisioning policies. For simplicity, FIG. 1 represents unidirectional traffic flow, but the same TESI and OAM messages are used for the reverse direction of the traffic.

Figure 2:
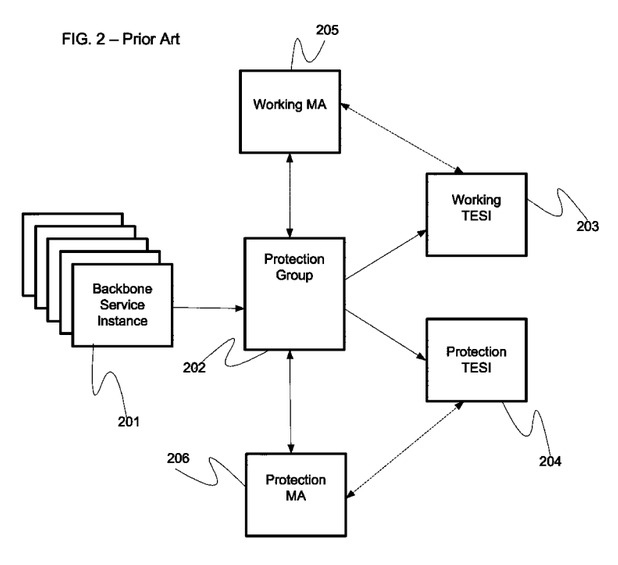
FIG. 2 is a diagrammatic illustration of a prior-art 1:1 state machine.

A non load-sharing architecture is used when a protection group is uniquely associated with one protection tunnel and one working TESI. FIG. 2 shows the non-load-sharing state machine at each end point of the TESI. Backbone Service Instances 201 are mapped to one of many protection groups 202 which is standardized in IEEE 802.1Qay. A working TESI 203 and a protection TESI 204 are associated with the protection group 202. A working MA 205 is associated with the working TESI 203. A protection maintenance association 206 is associated with the protection TESI 204. The maintenance associations 205, 206, receive the OAM flow from the working and protection TESIs 203, 204 and provide the protection group 202 with a state for its respective TESI. The protection group 202 uses the information provided by the MAs 205, 206 to select which TESIs 203, 204 are being used as the forwarding path to carry the traffic from the Backbone Service Instances 201.

There exist proposals to extend the 1:1 protection capability to allow sharing of TESI. However these proposals involve additional state machines with added complexity that directly affects scalability and implementability. There is a need to provide a simple extension to the 1:1 protection architecture to include the case where a protection TESI or a working TESI is shared by multiple protection groups to provide alternative protection schemes and minimize the use of protection resources. Ultimately, m protection groups could share n protection TESI where m<=n. There is also a need to use working TESIs as protection TESIs to enable load sharing and avoid bandwidth remaining idle while awaiting use for protection.

SUMMARY OF THE INVENTION

According to one embodiment, a system is provided for sharing a protection path between at least two protection groups in a network. The system includes:
  at least one working path associated with each of the protection groups,
  at least one working maintenance entity group ("WMEG") monitoring the status of each of the working paths, each WMEG notifying the protection group associated with the monitored working path of changes in the status of the monitored working path,
  at least one protection maintenance entity group ("PMEG") monitoring the status of the protection path, each PMEG notifying each of the protection groups of changes in the status of the protection path, and
  each of the protection groups being switchable to the protection path in response to the receipt of notifications from the WMEG of changes to a non-operational status for the respective working paths associated with each of the protection groups.

In one implementation, each of the protection groups is automatically or manually switchable to the associated working path in response to the receipt of a notification a change to an operational status for the respective working paths associated with the protection groups. A scheduling algorithm may be used to provide differentiated access to the bandwidth of the protection path based on configured differentiation parameters.

An alternative embodiment provides a system for sharing at least two protection paths between at least two protection groups in a network. The system includes:
  a working path associated with each of the protection groups,
  a working maintenance entity group ("WMEG") monitoring the status of each of the working paths, each WMEG providing the status of the monitored working path to the associated protection group,
  a protection maintenance entity group ("PMEG") monitoring the status of each of the protection paths, the PMEG providing the status of the monitored protection path to each of the protection groups, and each protection group maintaining a list of operational protection paths and switching to one of the protection paths in the list in response to the receipt of a notification from the WMEG of a change to a non-operational status for the respective working paths associated with the protection groups.

In one implementation, each protection group is switchable to a working path automatically or manually upon receipt of a notification of a change to an operational status for an associated working path. A scheduling algorithm may be used to provide differentiated access to the bandwidth of a protection path based on configured differentiation parameters. The list of operational protection paths is preferably prioritized, and the protection path to which a protection group is switched is randomly selected from the list of operational protection paths.

A further embodiment provides a system for load sharing working and protection paths between first and second protection groups in a network. This system includes:

a first working path associated with the first protection group, a second working path associated with the second protection group, a first maintenance entity group monitoring the status of the first working path and notifying the first and second protection groups of changes in the status of the first working path, a second maintenance entity group monitoring the status of the second working path and notifying the first and second protection groups of changes in the status of the second working path, the first protection group being switchable to the second working path upon receipt of a non-operational status notification from the first maintenance entity group, and the second protection group being switchable to the first working path upon receipt of an non-operational status notification from the second maintenance entity group.

BRIEF DESCRIPTION OF THE DRAWINGS

The invention will be better understood from the following description of preferred embodiments together with reference to the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Since this invention also applies to other connection-oriented protection switched technology using end-to-end tunnel (e.g. MPLS-TP tunnel or GRE), the description of the invention uses generic terms such as Protection Group which refers, for example, in the IEEE 802.1Qay to a protection group but can be implemented as a grouping of MPLS or GRE tunnels. The term Logical Transport Resource (LTR) will be used herein to refer to one end-to-end path or, in the case of the IEEE 802.1Qay, to the TESI or to LSP or tunnels as defined in MPLS-TE, MPLS-TP or GRE technology, respectively. The term Maintenance Entity Group (MEG) is used in this description to refer the association between a LTR and the protection group as implemented, for example, in IEEE 802.1Qay using what is called a Maintenance Association (MA).

There is a need to extend this architecture to include the case where a protection LTR or a main LTR is shared by multiple protection groups. Ultimately, m protection groups could share m protection LTR where m<=n. There is a need to configure the 1:1 non-load-sharing state machine to handle load sharing and alternative protection schemes without affecting scalability and without introducing undue complexity such as new state machines.

Figure 3:
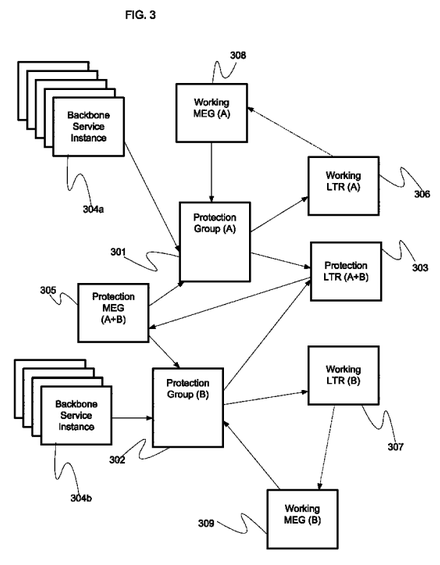
FIG. 3 is a diagrammatic illustration of a configuration of a 1:1 state machine in which two or more Virtual Transport Resources (VTRs) can share a protection Logical Transport Resource (LTR).

An embodiment of an alternative protection scheme is shown in FIG. 3. Protection group A 301 and protection group B 302 share a protection LTR 303. Different groups of backbone service instances 304a and 304b are mapped to the two protection groups 301 and 302, respectively. A single protection MEG 305 is used to manage the OAM packets from the protection LTR 303. The protection MEG 305 monitors the status of a protection path and provides status updates to the protection groups A 301 and B 302. The status updates include notifications that the status of a path has changed to non-operational because of failures or maintenance/upgrade activities. Each protection group 301, 302 has its own working LTR 306, 307 with respectively corresponding working MEGs 308, 309 each of which monitors the status of a working path. Using this model, the same state machine as the one used for non-load-sharing can be used. The protection MEG 305 needs to communicate the status to both protection groups 301, 302.

When the working path returns to operational status, the protection group can be configured to switch back to the working path manually or automatically in response to receipt of notification of a change to operational status from the working MEG 308 or 309. The LTRs can use a scheduling algorithm that favors one protection group over another protection group based on configured differentiation parameters. For example, a protection group that carries real-time traffic could get preferential access to the LTR bandwidth over the protection group that carries non-real-time traffic. Using a hierarchical scheduler, one protection group can be given higher weight or priority than another protection group, regardless of the type of traffic it carries.

Figure 4:
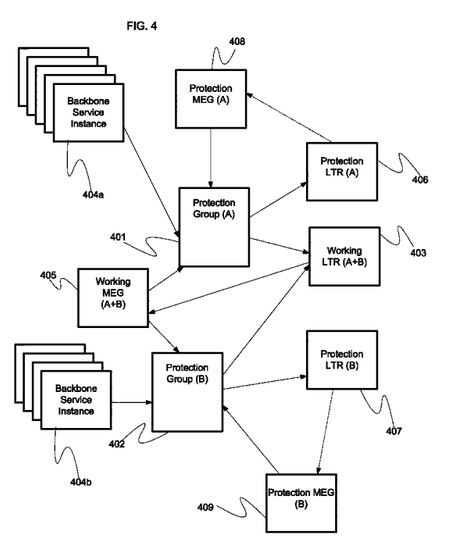
FIG. 4 is a diagrammatic illustration of a configuration of a 1:1 state machine in which two of more VTRs can share one main LTR.

Another embodiment of the architecture is shown in FIG. 4. Protection group A 401 and protection group B 402 share a working LTR 403. Different groups of backbone service instances 404a and 404b are mapped to the two protection groups 401 and 402 respectively. A single working MEG 405 is used to manage the OAM packets from the working LTR 403. The protection MEG 405 provides status updates to the protection groups A 401 and B 402. Each protection group 401, 402 has its own working LTRs 406, 407 with respectively corresponding protection MEGs 408, 409. Using this model, the same state machine as the one used for non-load-sharing can be used. The protection MEGs 408, 409 need to communicate the status to both protection groups 401, 402.

When the working path returns to operational status, the protection group can be configured to switch back to the working path manually or automatically upon receipt of operational status notification from the working MEG 405. The working LTR 403 can use a scheduling algorithm that favors traffic from one protection group over another protection group based on configured differentiation parameters. For example, a protection group that carries real-time traffic could get preferential access to the LTR bandwidth over the protection group that carries non-real-time traffic. Using a hierarchical scheduler, one protection group can be given higher weight or priority than another protection group, regardless of the type of traffic it carries.

Figure 5:
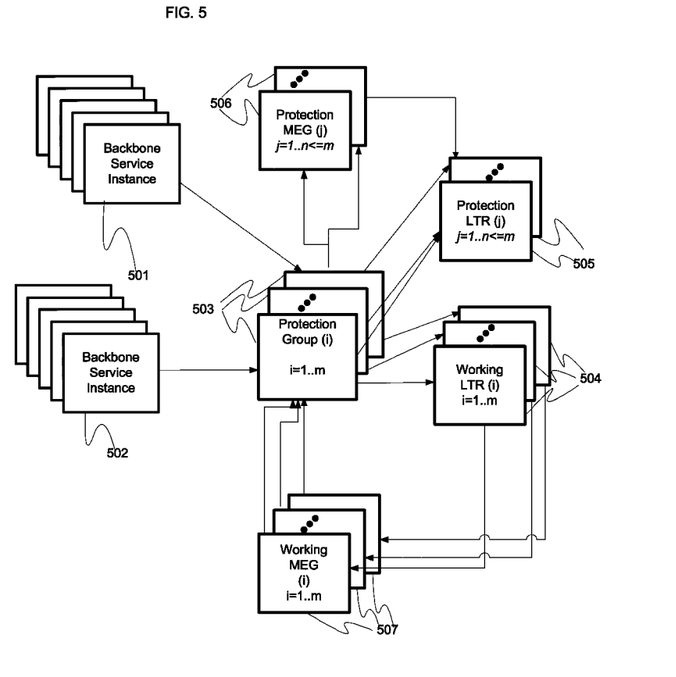
FIG. 5 is a diagrammatic illustration of a configuration of the 1:1 state machine in which two or more VTRs can share two or more protection LTRs.

A more general embodiment is depicted in FIG. 5. In this case, one or more backbone service instances 501, 502 are mapped to one of m protection groups 503. Each protection group 503 is dedicated one working LTR 504 and uses one of the n protection LTR 505, where n≤m. In this case, a protection MEG 506, which manages the OAM packets from one protection LTR 505, conveys status information about the protection LTR 505 to one or more protection groups 503. The working MEG i 507 manages the OAM flow from the working LTR 504 and conveys status information about the working LTR i 504 to its associated protection groups i 503. Each protection group 503 decides on which LTR to use as active, based on the information provided by the working and protection MEGs 506, 507. The protection group keeps track of the operational protection paths and switches to one of them when the working path is non-operational. The protection group could use a prioritized list for selecting an operational protection path, or a random selection can also be made.

When the working path returns to operational status, the protection group can be configured to switch back to the working path manually or automatically upon receipt of operational status notification from the working MEG. The LTR can use scheduling algorithm that favors traffic from one protection group over another protection group based on configured differentiation parameters. For example a protection group that carries real-time traffic could get preferential access to the LTR bandwidth over the protection group that carries non-real-time traffic. Using a hierarchical scheduler, one protection group can be given higher weight or priority than another protection group regardless of the type of traffic it carries.

Figure 6:
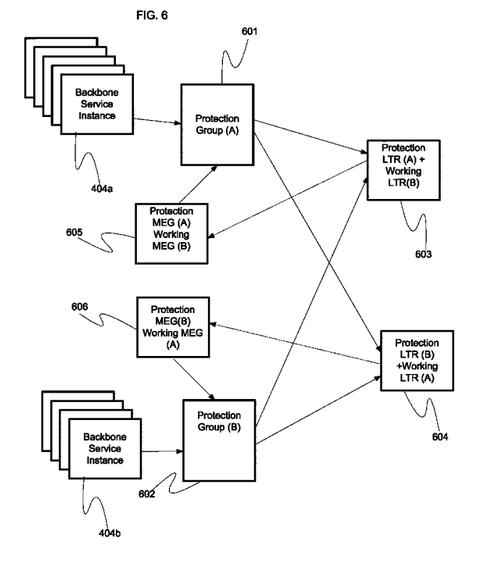
FIG. 6 is a diagrammatic illustration of a load-sharing configuration of a 1:1 state machine.

Another embodiment of the invention is depicted in FIG. 6. In this case, each of a pair of LTRs 603, 604 act as a working LTR for one protection group. For protection group A 601, when the working LTR 604 notifies the working MEG 606 of a failure, the protection group A 601 switches the traffic to its protection LTR 603. Similarly, for protection group B 602, when the working LTR 603 notifies the working MEG 605 of a failure, the protection group B 602 switches the traffic to its protection LTR 604. This configuration allows using the 1:1 state machine such that all links can be used to carry traffic when there are no failures. For example, Protection group B could be set up to carry best effort traffic, while protection group A carries traffic requiring predictable quality of service. When a failure occurs at protection group A, it switches to its protection LTR, and the scheduling algorithm at the LTR handles the class-of-service differentiation such that the quality of service is maintained. When the path becomes operational, the protection group can be configured to switch back to the working path manually or automatically upon receipt of operational status notification from the working MEG.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for sharing a protection path between at least two protection groups of network paths in a network, said system comprising:
   at least one working path associated with each of said protection groups,
   M working maintenance entity groups ("WMEGs") comprising a first plurality of endpoint systems, the first plurality of endpoint systems monitoring the status of each of said at least one working path, each WMEG, using at least the first plurality of end point systems, notifying the protection group associated with the working path monitored by the first plurality of endpoint systems of changes in the status of said working path monitored by the first plurality of endpoint systems,
   N protection maintenance entity groups ("PMEGs") comprising a second plurality of endpoint systems, the second plurality of endpoint systems monitoring the status of said protection path, each PMEG, using at least the second plurality of end point systems, notifying each of said at least two protection groups of changes in the status of said protection path, and each of said protection groups sharing said protection path and being switchable to said protection path in response to the receipt of a first notification from said WMEG of a change to a non-operational status for the respective working paths associated with said protection groups;
   wherein M and N are integers equal to or greater than 2, wherein N is less than or equal to M, and wherein each of said at least one working path is in a same maintenance entity group comprising said WMEG such that a single 1:1 state machine is operated between said WMEG and said PMEG with load sharing between each of said at least one working path and said protection path, and
   wherein each of said protection groups are automatically switchable to the respective working paths in response to the receipt of a second notification from said WMEG of change to an operational status for the respective working paths associated with said protection groups;
   wherein said system includes a scheduling algorithm that prioritizes data traffic from one of the said protection groups in order to cause the prioritized data traffic to access bandwidth with preference over the rest of the data traffic; and
   wherein a WMEG of said M WMEGs, using at least the first plurality of end point systems, manages Operation Administration and Maintenance ("OAM") packets from said working paths and conveys status information about said working paths to their associated protection groups using the OAM packets and wherein a PMEG of said N PMEGs, using at least the second plurality of end point systems, manages OAM packets from said protection path and conveys status information about said protection path to one or more protection groups using the OAM packets.

2. A method of sharing a protection path between at least two protection groups of network paths in a network, said method comprising associating at least one working path with each of said protection groups, monitoring the status of each of said at least one working path with a first plurality of endpoint systems in M working maintenance entity groups ("WMEGs"), each WMEG, using at least the first plurality of end point systems, notifying the protection group associated with the monitored working path of changes in the status of the monitored working path, monitoring the status of said protection path with a second plurality of endpoint systems in N protection maintenance entity groups ("PMEGs"), each PMEG, using at least the second plurality of end point systems, notifying each of said at least two protection groups of changes in the status of said protection path, and switching a selected one of said protection groups to said protection path in response to the receipt of a first notification from said WMEG of a change to a non-operational status for the working path associated with said selected protection group, wherein each of said protection groups share said protection path, wherein M and N are integers equal to or greater than 2, wherein N is less than or equal to M, and wherein each of said at least one working path is in a same maintenance entity group comprising said WMEG such that a single 1:1 state machine is operated between said WMEG and said PMEG with load sharing between each of said at least one working path and said protection path, and wherein each of said protection groups are automatically switchable to the respective working paths in response to the receipt of a second notification from said WMEG of change to an operational status for the respective working paths associated with said protection groups;

wherein said system includes a scheduling algorithm that prioritizes data traffic from one of the said protection groups in order to cause the prioritized data traffic to access bandwidth with preference over the rest of the data traffic; and wherein a WMEG of said M WMEGs, using at least the first plurality of end point systems, manages Operation Administration and Maintenance ("OAM") packets from said working paths and conveys status information about said working paths to their associated protection groups using the OAM packets and wherein a PMEG of said N PMEGs, using at least the second plurality of end point systems, manages OAM packets from said protection path and conveys status information about said protection path to one or more protection groups using the OAM packets.

3. A system for sharing a protection path between at least two protection groups of network paths in a network, said system comprising a protection path associated with each of said protection groups, N protection maintenance entity groups ("PMEGs") comprising a first plurality of endpoint systems, the first plurality of endpoint systems monitoring the status of said protection paths and notifying each of said at least two protection groups of changes in the status of the protection paths monitored by the first plurality of endpoint systems, a plurality of working paths associated with said protection groups, M working maintenance entity groups ("WMEGs") comprising a second plurality of endpoint systems, the second plurality of endpoint systems monitoring the status of each of said working paths, each WMEG, using at least the second plurality of end point systems, notifying the protection group associated with the working path monitored by the second plurality of endpoint systems of changes in the status of the working path monitored by the second plurality of endpoint systems, and each of said protection groups sharing said protection path and being switchable to said protection path in response to the receipt of a first notification from said WMEG of a change to a non-operational status for the respective working paths associated with said protection groups, wherein M and N are integers equal to or greater than 2, wherein N is less than or equal to M, and wherein said monitored protection path is in a maintenance entity group comprising said PMEG such that a single 1:1 state machine is operated between said WMEG and said PMEG with load sharing between each of said protection groups and said protection path, and wherein each of said protection groups are automatically switchable to the respective working paths in response to the receipt of a second notification from said WMEG of change to an operational status for the respective working paths associated with said protection groups;

wherein said system includes a scheduling algorithm that prioritizes data traffic from one of the said protection groups in order to cause the prioritized data traffic to access bandwidth with preference over the rest of the data traffic; and wherein a WMEG of said M WMEGs, using at least the second plurality of end point systems, manages Operation Administration and Maintenance ("OAM") packets from said working paths and conveys status information about said working paths to their associated protection groups using the OAM packets and wherein a PMEG of said N PMEGs, using at least the first plurality of end point systems, manages OAM packets from said protection path and conveys status information about said protection path to one or more protection groups using the OAM packets.

4. A method of sharing a protection path between at least two protection groups of network paths in a network, said method comprising associating a protection path with each of said protection groups, monitoring the status of said protection path with a first plurality of endpoint systems in N protection maintenance entity groups ("PMEGs") and notifying, using at least the first plurality of end point systems, each of said at least two protection groups of changes in the status of the monitored protection path, associating working paths with said protection groups, monitoring the status of each of said working paths with a second plurality of endpoint systems in M working maintenance entity groups ("WMEGs") and notifying, using at least the second plurality of end point systems, the protection group associated with the monitored working path of changes in the status of the monitored working path, and switching a selected one of said protection groups to said protection path in response to the receipt of a notification from said WMEG of a change to a non-operational status for the respective working paths associated with said selected protection group, wherein each of said protection groups share said protection path, wherein M and N are integers equal to or greater than 2, wherein N is less than or equal to M, and wherein said monitored protection path is in a maintenance entity group comprising said PMEG such that a single 1:1 state machine is operated between said WMEG and said PMEG with load sharing between each of said protection groups and said protection path, and wherein each of said protection groups are automatically switchable to the respective working paths in response to the receipt of a second notification from said WMEG of change to an operational status for the respective working paths associated with said protection groups;

wherein said system includes a scheduling algorithm that prioritizes data traffic from one of the said protection groups in order to cause the prioritized data traffic to access bandwidth with preference over the rest of the data traffic; and wherein a WMEG of said M WMEGs, using at least the second plurality of end point systems, manages Operation Administration and Maintenance ("OAM") packets from said working paths and conveys status information about said working paths to their associated protection groups using the OAM packets and wherein a PMEG of said N PMEGs, using at least the first plurality of end point systems, manages OAM packets from said protection path and conveys status information about said protection path to one or more protection groups using the OAM packets.

5. A system for sharing at least two protection paths between at least two protection groups in a network, said system comprising working paths associated with said protection groups, M working maintenance entity groups ("WMEGs") comprising a first plurality of endpoint systems, the first plurality of endpoint systems monitoring the status of each of said working paths, each WMEG, using at least the first plurality of end point systems, providing the status of the working path monitored by the first plurality of endpoint systems to the associated protection group, N protection maintenance entity groups ("PMEGs") comprising a second plurality of endpoint systems, the second plurality of endpoint systems monitoring the status of each of said protection paths, said PMEG, using at least the second plurality of end point systems, providing the status of the protection path monitored by the second plurality of endpoint systems to each of said protection groups, and each protection group maintaining a list of operational protection paths and switching to one of said protection paths in said list in response to the receipt of a notification from said WMEG of a change to a non-operational status for the respective working paths associated with said protection groups, wherein M and N are integers equal to or greater than 2, wherein N is less than equal to M, and wherein each of said working paths is in a same maintenance entity group comprising said WMEG such that a single 1:1 state machine is operated between said WMEG and said PMEG with load sharing between each of said working paths and each of said protection paths, and wherein each of said protection groups are automatically switchable to the respective working paths in response to the receipt of a second notification from said WMEG of change to an operational status for the respective working paths associated with said protection groups;

wherein said system includes a scheduling algorithm that prioritizes data traffic from one of the said protection groups in order to cause the prioritized data traffic to access bandwidth with preference over the rest of the data traffic; and wherein a WMEG of said M WMEGs, using at least the first plurality of end point systems, manages Operation Administration and Maintenance ("OAM") packets from said working paths and conveys status information about said working paths to their associated protection groups using the OAM packets and wherein a PMEG of said N PMEGs, using at least the second plurality of end point systems, manages OAM packets from said protection paths and conveys status information about said protection paths to one or more protection groups using the OAM packets.

6. The system of claim 5 in which said list of operational protection paths is prioritized.

7. The system of claim 5 in which said protection path to which a protection group is switched is randomly selected from said list of operational protection paths.

8. A system for load sharing working paths between first and second protection groups in a network, said system comprising a first working path associated with said first protection group, a second working path associated with said second protection group, and M maintenance entity groups;

a first maintenance entity group comprising first plurality of endpoint systems, the first plurality of endpoint systems monitoring the status of said first working path and notifying said first and second protection groups of changes in the status of said first working path, a second maintenance entity group comprising a second plurality of endpoint systems, the second plurality of endpoint systems monitoring the status of said second working path and notifying said first and second protection groups of changes in the status of said second working path, said first protection group being switchable to said second working path upon receipt of a non-operational status notification from said first maintenance entity group, said second protection group being switchable to said first working path upon receipt of an non-operational status notification from said second maintenance entity group, and wherein M is an integer equal to or greater than 2 and a single 1:1 state machine operated between said first maintenance entity group and said second maintenance entity group with load sharing between said first and second protection groups and said first working path and said second working path, and wherein each of said protection groups are automatically switchable to the respective first or second working path in response to the receipt of a second notification from said WMEG of change to an operational status for the respective working paths associated with said protection groups;

wherein said system includes a scheduling algorithm that prioritizes data traffic from one of the said protection groups in order to cause the prioritized data traffic to access bandwidth with preference over the rest of the data traffic; and wherein a maintenance entity group of said M maintenance entity groups that manages, using at least the first plurality of end point systems, Operation Administration and Maintenance ("OAM") packets from the first and second working paths conveys status information about said first and second working paths to its associated protection groups using the OAM packets.

* * * * *